United States Patent [19]
Stultz

[11] Patent Number: 5,654,974
[45] Date of Patent: Aug. 5, 1997

[54] PASSIVE Q-SWITCH USING MULTIPLE SATURABLE ABSORBER MATERIALS

[75] Inventor: Robert D. Stultz, Huntington Beach, Calif.

[73] Assignee: Hughes Electronics, Los Angeles, Calif.

[21] Appl. No.: 540,734

[22] Filed: Oct. 11, 1995

[51] Int. Cl.$^6$ ................................................ H01S 3/113
[52] U.S. Cl. ............................. 372/11; 372/10; 372/17
[58] Field of Search ................................. 372/10, 11, 17

[56] References Cited

U.S. PATENT DOCUMENTS

| | | |
|---|---|---|
| 3,500,241 | 3/1970 | Bjorkoholm ........................ 372/17 |
| 3,513,409 | 5/1970 | Polk et al. ........................ 372/17 |
| 4,682,336 | 7/1987 | Hendrix et al. ........................ 372/11 |

OTHER PUBLICATIONS

Jackel, S. et al., "Temporal pulse-shaping . . . " J. Phys. E.: Sci. Instrum., 15(2), Feb. 1982, pp. 255–259.

*Primary Examiner*—Rodney B. Bovernick
*Assistant Examiner*—Robert E. Wise
*Attorney, Agent, or Firm*—Michael W. Sales; Wanda K. Denson-Low

[57] ABSTRACT

A laser resonant cavity employs a dye sheet Q-switch disposed to receive the output of a laser and a $Cr^{4+}$:YAG Q-switch disposed adjacent the dye sheet Q-switch. Disadvantageous aspects of either Q-switch when used alone are eliminated, resulting in higher output energy and overall efficiency. A new Q-switch employing a dye sheet sandwiched between a pair of $Cr^{4+}$:YAG plates is also disclosed.

21 Claims, 1 Drawing Sheet

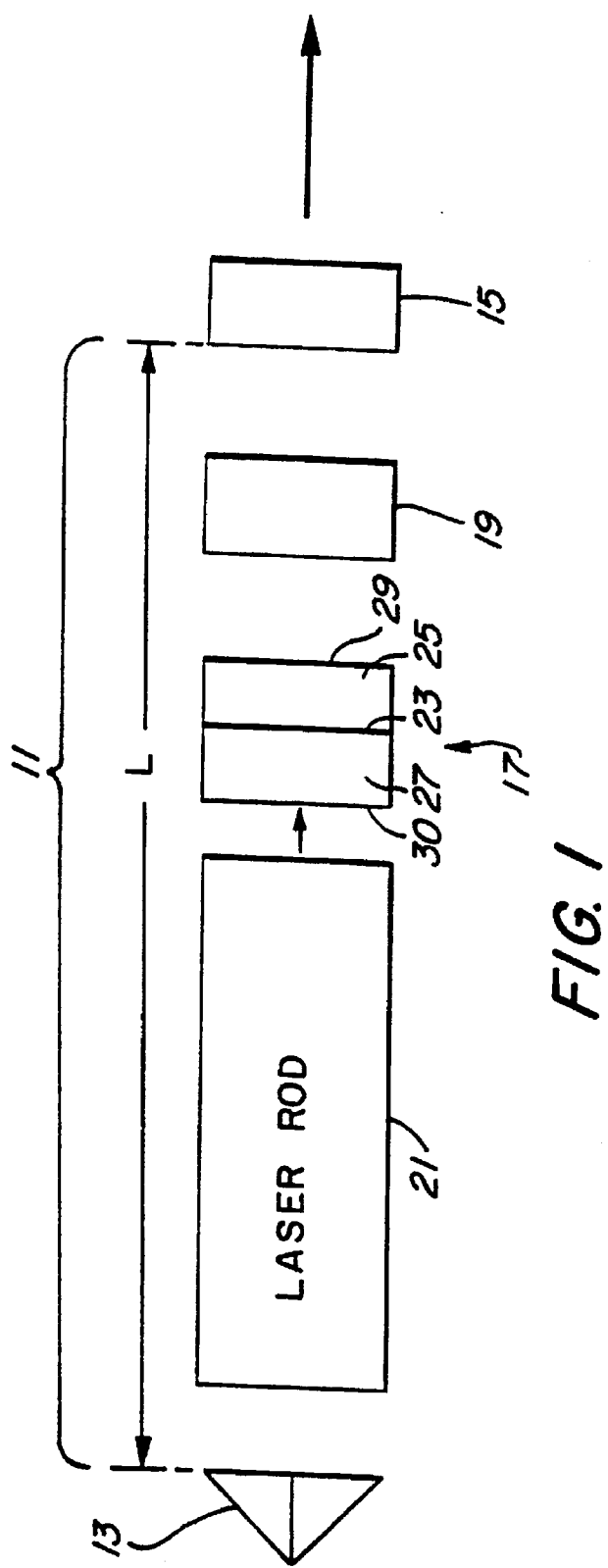
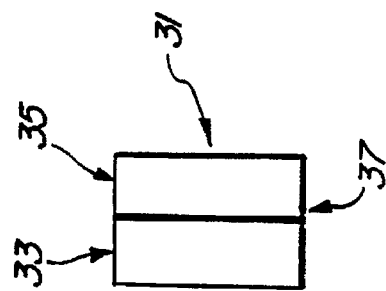

PASSIVE Q-SWITCH USING MULTIPLE SATURABLE ABSORBER MATERIALS

BACKGROUND OF THE INVENTION

1. Field of the Invention

The subject invention relates to lasers and, more particularly, to an improved Q-switch for use in a laser resonant cavity.

2. Description of Related Art

The quality factor, Q, of a laser resonant cavity is defined as the ratio of energy stored in the cavity to the energy loss per cycle. The higher the Q, the lower the losses. In the case of a method known as Q-switching, the losses in the cavity are initially kept high, i.e., low Q, for a period of time during which the laser gain medium is pumped up to a very high population inversion. The Q is then rapidly restored to a high value, i.e., low losses, causing a short pulse of laser light with high peak power (a so-called "giant" pulse) to be generated.

Q-switching may be accomplished "actively" or "passively." Passive Q-switching may be accomplished by the insertion of a saturable absorber into the cavity, i.e., a material which has relatively high losses (absorption) at low incident intensity at the laser wavelength, but possesses significantly lower losses at high incident intensity. The saturable absorber therefore results in a low cavity Q during the initial pumping of the gain medium; however, when the gain is sufficient to overcome the low intensity losses and lasing begins, the absorber is quickly "bleached" to a low-loss state (high Q) and a giant pulse is generated.

The passive Q-switch used for 1.06 μm lasers has frequently consisted of a BDN dye-impregnated acetate sheet (manufactured by Kodak), sandwiched between two glass plates with an index-matching adhesive. The BDN dye used in this case has a large absorption cross-section ($\sim 10^{-16}$ cm$^2$), but suffers from considerable excited-state absorption (ESA). The contrast C (ratio of ground-state to excited-state cross-section) is about 5. The maximum transmittance (completely saturated) is given by:

$$T_{max} = \exp\left( \frac{\ln[T_0]}{C} \right) \quad (1)$$

where $T_0$ is the small-signal transmittance. For a dye Q-switch with a small-signal transmittance of 40%, $T_{max}=$ 83%.

An alternative saturable absorber material for 1 μm radiation utilizes the tetravalent chromium ion, e.g. Cr$^{4+}$:YAG. A contrast of C$\approx$10 has been measured for Cr$^{4+}$:YAG. This means that a Cr$^{4+}$:YAG Q-switch having $T_0$=40% can be bleached to $T_{max}$=91%. A higher $T_{max}$ results in fewer losses during the Q-switched laser pulse and a higher overall laser efficiency. The saturable absorber material Cr$^{4+}$:YAG has a significantly smaller cross-section ($\sim 2\times 10^{-18}$ cm$^2$) than the BDN dye, as well as a much longer relaxation lifetime: 4 μs for Cr$^{4+}$:YAG, compared to 5 ns for the BDN dye, both times measured at room temperature.

One problem that has been observed with the Cr$^{4+}$:YAG absorber material is a direct result of the longer lifetime. Because a bleached portion of the Cr$^{4+}$ Q-switch remains open for a few microseconds, additional pulses have been observed following the primary pulse with delays of a few hundred nanoseconds or so. This characteristic is highly undesirable for many applications.

OBJECTS AND SUMMARY OF THE INVENTION

It is therefore an object of the invention to improve lasers;

It is another object to improve Q-switches employed in laser resonators; and

It is a further object of the invention to improve performance of passive Q-switches employed with 1.06 μm lasers.

According to the invention, both the BDN dye and Cr$^{4+}$:YAG saturable absorbers are employed simultaneously within the laser resonator cavity. In this manner, the undesirable characteristics of both absorbers are thereby mitigated. The Cr$^{4+}$:YAG absorber bleaches to a higher transmittance than the BDN dye, and the fast relaxation of the BDN dye prevents multiple pulsing. If, for example, $T_0$=63.2% for both Q-switches (net $T_0$=40%), then $T_{max}=$ 87%. This $T_{max}$ is several percent higher than that of the BDN dye alone.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a schematic diagram illustrating a laser resonator cavity employing the preferred embodiment; and FIG. 2 is a side schematic view of an alternate Q-switch embodiment.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a particularly efficient and readily constructable Q-switch employing multiple absorber materials.

A laser employing the preferred embodiment multiple absorber Q-switch is illustrated in FIG. 1. The resonator cavity 11 of FIG. 1 includes a corner-cube reflector 13 (incident surface antireflective, AR-coated) and a 43% reflective output mirror 15. Both the reflector 13 and the mirror 15 may be conventional resonator cavity components. The physical length "L" of the resonator cavity 11 in an illustrative embodiment was 12.9 cm.

The laser of FIG. 1 further includes a laser rod 21, a dye Q-switch assembly 17, and a Cr$^{4+}$:YAG Q-switch 19. The laser rod 21 is preferably an Nd:YAG rod which is flashlamp-pumped and delivers its output energy to the dye Q-switch assembly 17. The dye Q-switch assembly 17 preferably comprises a Kodak dye sheet 23 sandwiched between two glass plates 25, 27 with outer surfaces 29, 30 AR-coated and inner surfaces attached to the dye sheet 23 by an index matching adhesive. The small-signal transmittance of this Q-switch assembly 17 in an illustrative embodiment was 40%. The Cr$^{4+}$:YAG Q-switch 19 comprises a plate of Cr$^{4+}$:YAG crystal, which is AR-coated and has a small-signal 1.06-μm transmittance of 52%.

An experiment was performed employing the Q-switches 17, 19, as discussed above, and a second dye-switch assembly having a small-signal transmittance close to that of the Cr$^{4+}$:YAG absorber material. The 40% dye Q-switch was first tested alone, followed by tests of selected pairs of the Q-switches. The pairs of switches were activated simultaneously according to actuating mechanisms well-known in the art. The results of the Q-switched laser experiment are summarized in Table 1.

TABLE 1

| Parameter | 40% dye Q-switch only | 40% dye Q-switch plus 2nd dye Q-switch | 40% dye Q-switch plus $Cr^{4+}$: YAG Q-switch |
|---|---|---|---|
| Output energy (mJ) | 50 | 68 | 80 |
| Flashlamp input at laser threshold (J) | 6.9 | 10.6 | 10.8 |
| Pulsewidth (ns) | 6.5 | 5 | 6 |

As reflected in Table 1, the output energy with the dye/$Cr^{4+}$:YAG Q-switch combination was about 18% higher than that of the dye/dye combination. The laser threshold was almost exactly the same in both cases, resulting in a significant increase in overall efficiency. No multiple pulsing was observed. The pulsewidth for the dye/dye combination was slightly shorter, but the difference is insignificant for most applications.

It should be noted that using both absorber materials 17, 19 in the resonator cavity 11 should extend the attainable average laser power. Since the amount of absorbed energy in the plastic dye sheet is less for a given application, and since YAG is a robust, high thermal conductivity host material, their combination can be used at higher average power levels than the dye Q-switch alone.

In an alternate embodiment, the first Q-switch 17 can comprise a new combination Q-switch assembly 31 as shown in FIG. 2. This Q-switch assembly 31 includes first and second $Cr^{4+}$:YAG crystal plates 33, 35 sandwiching a Kodak BDN dye-impregnated acetate sheet 37. The $Cr^{4+}$:YAG plates 33, 35 in the alternate configuration are each one-half the thickness of the $Cr^{4+}$:YAG Q-switch used in the experiments summarized in Table 1. The $Cr^{4+}$:YAG plates 33, 35 are attached to the dye sheet 37 using an index-matching adhesive. By using the $Cr^{4+}$:YAG crystals 33, 35 in place of the glass support plates 25, 27 of the dye Q-switch assembly 17 of FIG. 1, the maximum power can be extended further, since the thermal diffusivity of YAG is at least an order of magnitude higher than that of glass.

In summary, according to the invention, both the BDN dye acetate sheet saturable absorber and the $Cr^{4+}$:YAG saturable absorber are employed together in a laser resonator cavity, with the purpose of yielding better performance than either saturable absorber material alone. The invention finds application in any device which incorporates a passively Q-switched oscillator and, more specifically, one which incorporates a single-mode oscillator at high average power.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A laser Q-switch apparatus for use with a laser rod and a reflective output mirror comprising:
   a first Q-switch employing a first absorber material having a first desired performance parameter; and
   a second Q-switch employing a second absorber material, the second absorber material having a second desired performance parameter, wherein said first Q-switch is positioned between said laser rod and said second Q-switch and said second Q-switch is positioned between said first Q-switch and said reflective output mirror and wherein the combination of the first and second absorber materials eliminates at least one undesirable performance parameter of either said first or said second Q-switch, while preserving both said first and second desired performance parameters.

2. The Q-switch apparatus of claim 1 wherein said first absorber material comprises a dye sheet.

3. The Q-switch apparatus of claim 2 wherein said dye sheet comprises a BDN dye-impregnated acetate sheet.

4. The Q-switch apparatus of claim 3 wherein said first Q-switch comprises first and second glass plates sandwiching said BDN dye-impregnated acetate sheet.

5. The Q-switch apparatus of claim 4 wherein said second Q-switch comprises a plate of $Cr^{4+}$:YAG crystal.

6. The Q-switch apparatus of claim 3 wherein said second absorber material comprises $Cr^{4+}$:YAG.

7. The Q-switch apparatus of claim 2 wherein said second absorber material comprises $Cr^{4+}$:YAG.

8. The Q-switch apparatus of claim 7 wherein said first Q-switch is positioned between a laser and said second Q-switch.

9. In a laser resonant cavity, the laser Q-switch apparatus comprising:
   a first Q-switch employing a saturable absorber comprising a dye; and
   a second Q-switch employing $Cr^{4+}$:YAG.

10. The Q-switch apparatus of claim 9 wherein said first Q-switch comprises a dye sheet sandwiched between first and second glass plates, each said glass plate having an antireflection coated outer surface.

11. The Q-switch apparatus of claim 10 wherein said second Q-switch comprises an antireflection coated plate of $Cr^{4+}$:YAG saturable absorber material.

12. The Q-switch apparatus of claim 9 wherein said first Q-switch comprises a BDN dye-impregnated acetate sheet sandwiched between first and second light transmissive plates and said second Q-switch comprises a plate of $Cr^{4+}$:YAG crystal material.

13. The Q-switch apparatus comprising:
   a $Cr^{4+}$:YAG Q-switch; and
   a second Q-switch means for eliminating multiple pulsing created by the relaxation lifetime of the $Cr^{4+}$:YAG Q-switch.

14. The Q-switch apparatus of claim 13 wherein said second Q-switch means comprise a dye sheet.

15. The Q-switch apparatus of claim 14 wherein said dye sheet comprises a BDN dye-impregnated acetate sheet.

16. A Q-switch apparatus comprising:
   first and second Q-switches used in combination wherein the output from said first Q-switch is input to said second Q-switch, the first Q-switch having a relative lifetime of a length which permits multiple pulsing and a transmittance higher than that of said second Q-switch, said second Q-switch having a relaxation time of a length which precludes multiple pulsing.

17. The Q-switch apparatus of claim 16 wherein said first Q-switch comprises $Cr^{4+}$:YAG.

18. The Q-switch apparatus of claim 17 wherein said second Q-switch includes a dye sheet saturable absorber material.

19. The Q-switch apparatus of claim 18 wherein said second Q-switch is disposed between a laser and said first Q-switch.

20. A Q-switch comprising:
   a dye sheet; and
   first and second $Cr^{4+}$:YAG crystal plates sandwiching said dye sheet.

21. The Q-switch of claim 20 wherein said dye sheet comprises a BDN dye-impregnated acetate sheet.

* * * * *